(No Model.)
B. F. WENGER.
HAY RAKE.
No. 490,697. Patented Jan. 31, 1893.
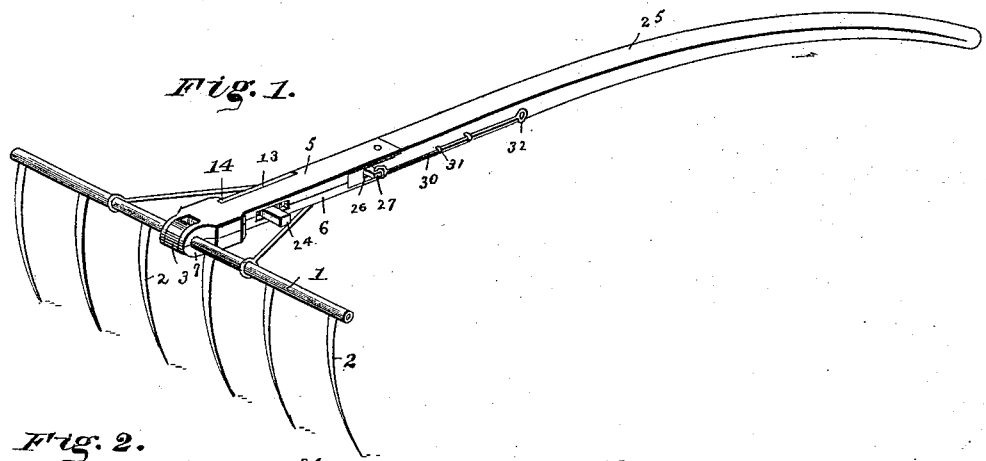
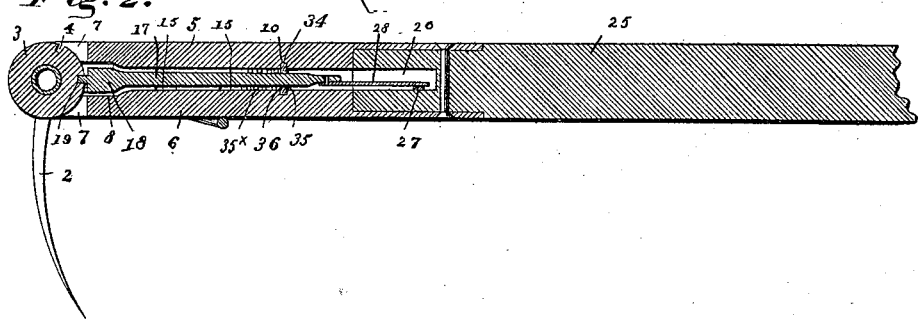
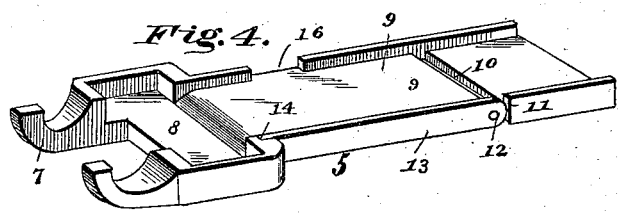
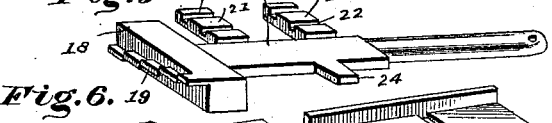
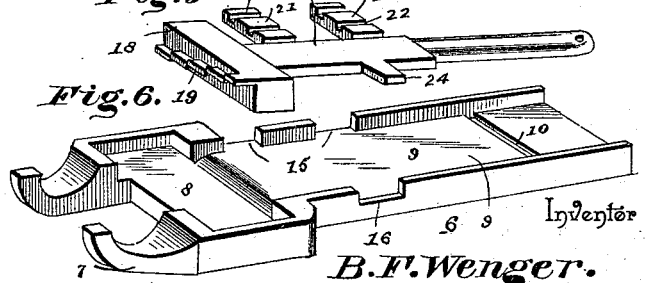

UNITED STATES PATENT OFFICE.

BENJAMINE F. WENGER, OF SOUTH ENGLISH, IOWA.

HAY-RAKE.

SPECIFICATION forming part of Letters Patent No. 490,697, dated January 31, 1893.

Application filed May 9, 1892. Serial No. 432,289. (No model.)

*To all whom it may concern:*

Be it known that I, BENJAMINE F. WENGER, a citizen of the United States, residing at South English, in the county of Keokuk and State of Iowa, have invented a new and useful Hay-Rake, of which the following is a specification.

My invention relates to improvements in hay rakes, the objects in view being to provide an improved rake embodying means for adjusting the head and handle at various angles, whereby hay may be expeditiously removed from a loader to a waiting wagon, and by reason of such adjustment may be manipulated by a single operator.

Other objects and advantages of the invention will appear in the following description, and the novel features thereof will be particularly pointed out in the claims.

Referring to the drawings—Figure 1 is a perspective of a rake embodying my invention. Fig. 2 is a longitudinal section through the connection between the head and handle. Figs. 3, 4, 5, and 6 are details in perspective of the parts going to make up the connection.

Like numerals of reference indicate like parts in all the figures.

1 designates the rake-bar, preferably formed of a piece of hollow pipe which, at intervals, has passed through it transversely rake-teeth 2. At its center the bar 1 is provided with a cylindrical boss 3, and said boss is provided, in this instance, with a pair of series of wards or recesses 4, the wards of each series being set one in advance of the other, as shown.

5 and 6 designate a pair of metal sections, said sections each being provided at their front ends with pairs of half-hooks 7, which half-hooks are in alignment and combine to form opposite bearing-eyes for receiving the cylindrical rake-head 1 at each side of its annular boss 3. In rear of the half-hooks the sections 5 and 6 are provided at their inner faces with recesses 8, and in rear of the same with a longitudinal recess 9, which near their rear ends are traversed by transverse grooves 10. The formation of these recesses 9 leaves flanges at the opposite sides of the sections, and one of said flanges is cut away at 11 and has pivoted at 12, in its cut-away portion, a locking-lever 13, adapted at its free end to take into a notch 14, formed in the end of the cut-away portion. The companion flange of the opposite section has notches or recesses 15, formed in it, and a single recess is formed in the remaining flanges of the sections, and indicated as 16.

17 designates the shank of a reciprocating latch, and the same lies loosely in the longitudinal recesses 9 of the opposite sections. This reciprocating latch is provided at its front end with a transverse head 18, which is provided with an inclined series of teeth 19, which teeth are designed to engage at any point with either of the series of wards with which the boss is provided. One side of the latch is provided with a pair of laterally-disposed lugs 21, and in the face of these lugs transverse notches 22 are formed. These lugs extend outwardly or laterally through the recesses 15, with which the section 6 is provided, and are designed to be engaged with the pivoted locking-lever 13, so that the latch is held supported at any point within the recesses of the two sections, and hence in position for engagement with the wards of the boss at a desired point. Upon the opposite side of the latch a lug 24 projects through the openings 16, of the sections. The rear ends of the sections embrace the handle 25, and said handle has formed therein a transverse slot 26 in which a lever 27 is mounted. The inner end of the lever is, by a short rod 28, connected to the rear end of the latch, and a wire 30 is connected to the outer end of the latch, passes through guide-eyes 31, located upon the handle and terminates in an eye 32, within easy reach of the operator having hold of the handle. A washer 34, having an opening 35, that receives the rear cylindrical part of the reciprocating latch, is mounted for transverse movement in the transverse grooves 10 of the two sections, and hence is capable of moving transversely with the latch as the same is adjusted by the operator who manipulates it through the medium of the lug 24. A coiled spring $35^\times$ is mounted on the rear end of the latch between a shoulder 36 formed on it and the aforesaid washer, the tendency of the spring being to normally force the latch to the front.

In operation, it will be seen that by first setting the reciprocating latch, or rather adjusting it laterally, it may at any time, by simply pushing upon the wire pull, withdraw the latch against the tension of the spring, thereby permitting the handle to be swung at the desired angle from the head, and by a release of the latch from the influence of the hand, the spring will throw the same into engagement with the wards of either of the series thereof, as will be evident.

Having described my invention, what I claim is—

1. In a rake, the combination with the cylindrical head provided at its center with an annular boss having its periphery provided with wards, of a handle, opposite metal sections clamped to the handle and having their inner faces recessed and terminating at their front ends in bearing-eyes for receiving the heads at opposite sides of the boss, the reciprocating latch mounted in the recess and narrower than the same, a spring for pressing the same forwardly, a head at the front end of the latch having a transverse series of teeth arranged in a diagonal line, means for adjusting the latch laterally, and means for withdrawing the teeth of the same from engagement with the wards, substantially as specified.

2. In a rake, the combination with the rake-head, provided at its center with a cylindrical boss having a pair of series of wards, the wards of each series being arranged one in advance of the other, of a handle, opposite metal sections embracing the handle, said sections having their outer ends provided with hooks combining to form bearing-eyes for receiving the rake-bar at opposite sides of the boss, and said sections having their opposing faces recessed, a latch narrower than the recess mounted therein and adapted for reciprocation, said latch being provided at one side with a pair of lugs projecting through the section and having transverse recesses or kerfs and at its opposite side with a manipulating lug, a head at the front end of the latch having a diagonal series of teeth corresponding with and adapted to engage the wards, a washer perforated to receive the rear end of the latch and mounted for movement in transverse grooves formed in the opposing faces, a coiled spring mounted on the rear end of the latch between a shoulder formed thereon and the washer, a lever pivoted in the handle, connections between the lever at its inner end and the rear end of the latch, a pull connected to the outer end of the lever and terminating near the rear end of the handle, and a locking-lever pivoted on one of the sections and adapted to engage the notches of the lugs, substantially as described.

In testimony that I claim the foregoing as my own I have hereto affixed my signature in the presence of two witnesses.

BENJAMINE F. WENGER.

Witnesses:
WM. MOORE,
M. W. BOWSER.